Oct. 29, 1935.  W. E. METHVIN  2,019,018
AIRCRAFT
Filed Dec. 14, 1934   2 Sheets-Sheet 1

Inventor
WILBUR E. METHVIN,
By Gardner J. O'Boyle
Attorney

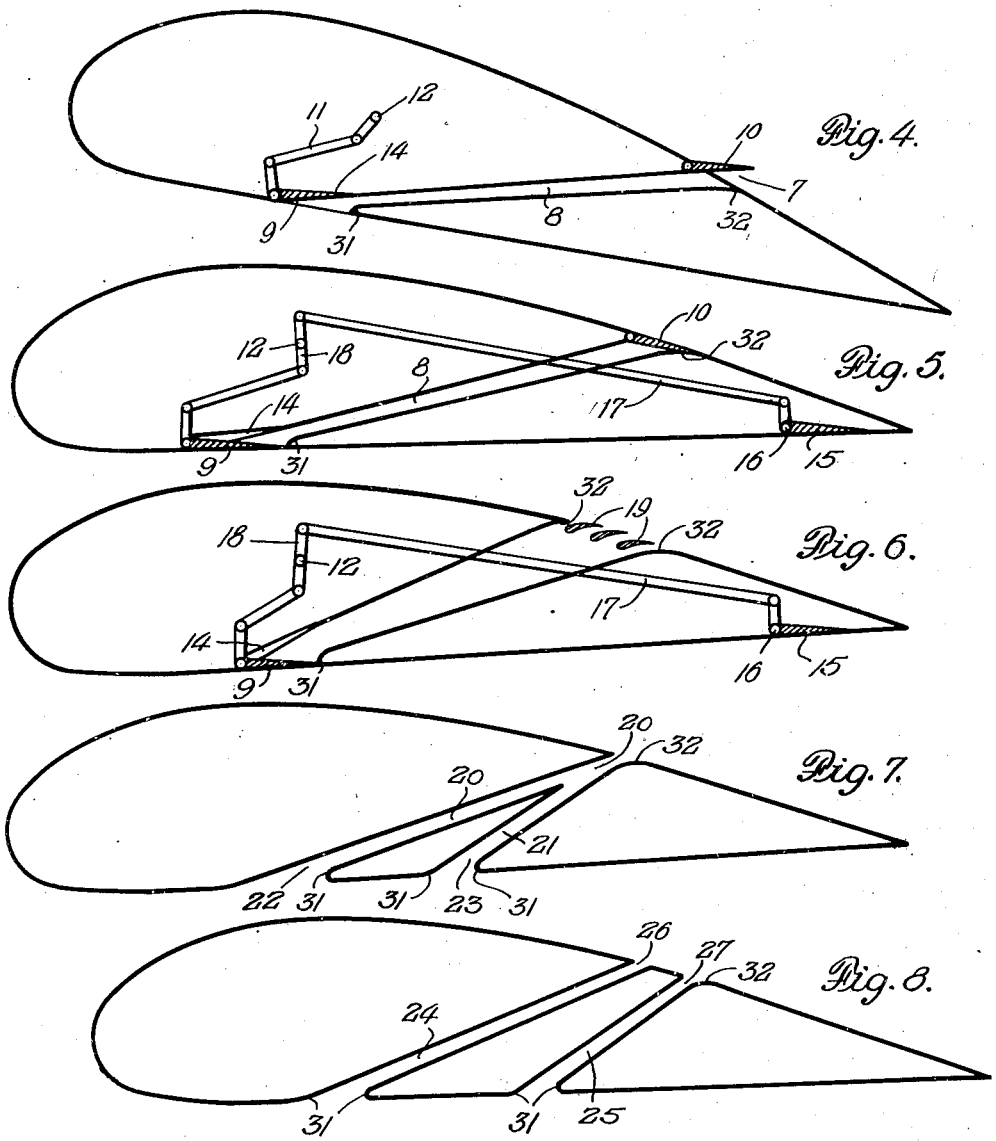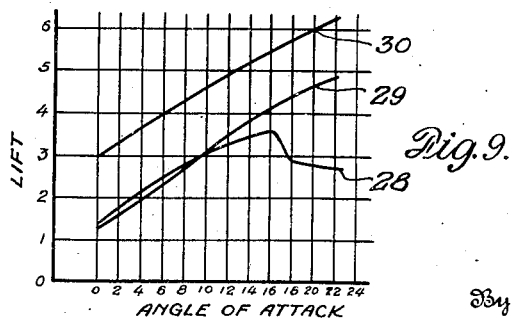

Patented Oct. 29, 1935

2,019,018

UNITED STATES PATENT OFFICE 2,019,018

AIRCRAFT

Wilbur E. Methvin, Lawrenceburg, Tenn.

Application December 14, 1934, Serial No. 757,582

16 Claims. (Cl. 244—12)

My invention relates to aircraft and more particularly to airplane wing structures.

Heretofore, various means have been suggested for effecting control of aircraft at low speeds. It has been proposed to modify the leading edge of a wing tip by means of a flap and slot; slats have been associated with the leading edge of a wing, the slats normally forming part of the wing surface and adapted to be moved forwardly to form a slot between the slat and the wing. It has also been proposed to use a wing flap, pivotally mounted on the under surfaces of a wing, in combination with an air passage through the wing and means to open or close the air passage. In the latter arrangement, the closure elements for the air passage are rigidly connected with the flap and function to provide a balanced control for the flap.

The present invention relates to an improved wing structure having a channel or passage formed therein, the channels extending longitudinally of the wing and positioned at a predetermined angle with respect to the chord of wing section. The air inlet and discharge openings of the channel are of such dimensions as to provide a tapered air passage, the inlet opening being larger than the outlet, suitable closure devices being provided for the openings. The invention also comprehends a wing constructed with a passage or channel at the wing tips, either alone or in combination with the longitudinally extending passage. The lower surface of the wing is provided with a flap, pivotally mounted at a point in front of the trailing edge of the wing, and means are provided for operating the wing flap simultaneously with the closure device for the air inlet opening of the channel.

I have found that effective control of aircraft, particularly at low speeds, can be obtained by providing a wing structure having a passage or channel extending therethrough, the angle of inclination of the channel or channels being substantially equal to the critical angle of the airfoil. By reason of this design, the lift of the aircraft is materially increased and maintained at high angles of attack. The arrangement of the passages, including the configuration and areas of the inlet and outlet openings thereof, is so related to the airfoil structure that a substantially uniform airflow is obtained along the top of the wing, as the angle of attack is varied.

An object of my invention is to provide an improved wing structure adapted to increase the lift and stability of airplanes.

Another object of my invention is to provide an improved airplane having means associated therewith adapted to increase its lift.

Yet another object of my invention is to provide an aircraft having an improved wing structure, constructed and arranged to materially increase the lift of the aircraft, the increased lift being maintained at high angles of attack.

A further object of my invention is to provide an aircraft having an improved wing structure adapted to permit of take-off and landing at low speeds.

A still further object of my invention is to provide an aircraft having a wing structure designed to simplify control of the aircraft during flight, landing and take-off.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Fig. 4 is a view of the section shown in Figure 3, showing the closure members in the open position.

Fig. 5 is a modification of the arrangement shown in Figure 3.

Fig. 6 is another modification of the arrangement shown in Figure 3.

Fig. 7 shows a modified form of the invention wherein a plurality of passages are used.

Fig. 8 is a modification of the arrangement shown in Figure 7; and

Fig. 9 is a graph of the lift curves showing a comparison between a standard airfoil and an airfoil constructed according to the present invention.

Figure 1:
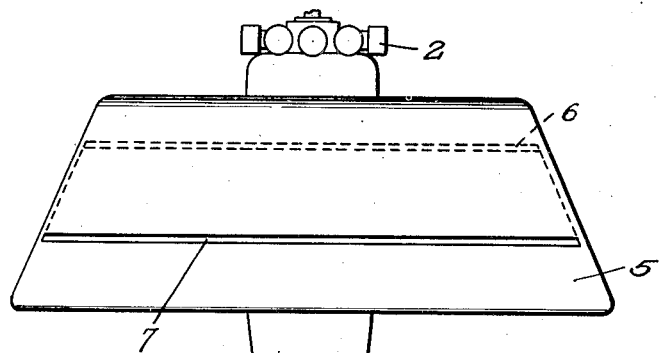
Figure 1 is a plan view of an aircraft having a wing structure provided with a passage extending longitudinally of the wing.
Figure 2:
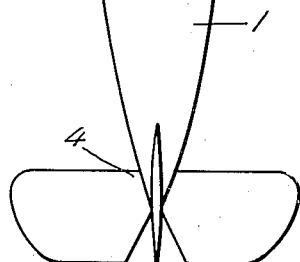
Fig. 2 is a plan view of an aircraft showing a passage longitudinal of the wing and passages near the wing tips.
Figure 2:
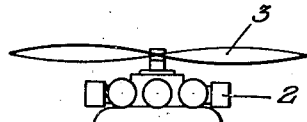
Figure 2:
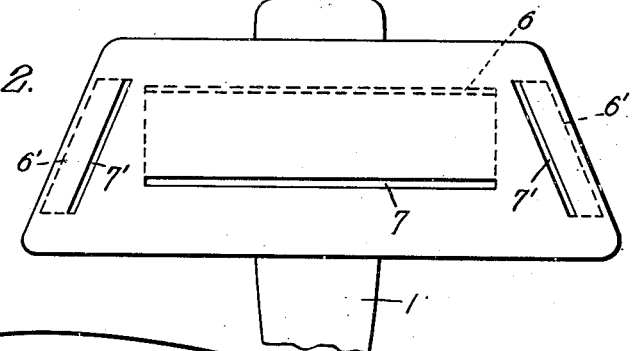

Referring to the drawings and more particularly to Figures 1 and 2, there is shown an aircraft comprising a fuselage 1, motor 2, propeller 3 and empennage designated generally by numeral 4. The wing 5 is provided with a channel or passage extending longitudinally thereof, the opening 6 on the under side of the wing surface being larger than the opening 7 on the upper surface of the wing. As shown in Figure 2, the wing may be provided with corresponding passages or channels having openings 6', 7' in the bottom and top respectively of the wing surface.

Figure 3:
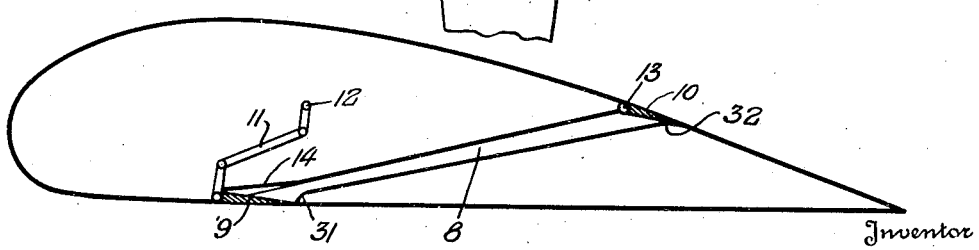
Fig. 3 is a sectional view of the airfoil showing the position of the passage and closure members associated therewith.

Referring to Figure 3, it will be noted that the angle of inclination with respect to a chord of the airfoil is substantially equal to the critical angle of the airfoil. The purpose of this arrangement is to permit the air which enters the passage through opening 6 to pass freely through the channel and break up any turbulence or burble formed on the upper surface of the wing at high angles of attack. By positioning the passages or channels at substantially the critical angle of the airfoil, the angle between the channel and a horizontal will be zero at the maximum angle of attack and between these limits, namely zero and maximum angles of attack, air is permitted to enter the channel and the flow therethrough generates a substantially uniform air flow on and along the upper surface of the wing.

The entrance and exit openings to the channel are adapted to be closed by means of suitable closure members in the form of flaps 9 and 10. Closure member 9 is connected by means of a linkage arrangement designated generally by numeral 11 with a shaft 12 adapted to be rotated by the aircraft control stick. Closure element 10 is pivotally mounted upon a support member 13 and is freely movable independently of flap 9. The wing is formed with a recess 14 near the entrance to the channel, the recess being provided to receive flap 9 when the flap is moved to the open position.

Referring to Figure 4, the position of the wing is shown when the aircraft is opening at a comparatively high angle of attack. It will be seen that closure member 10 has moved away from the opening 7 and that flap 9 is seated in the recess 14. When the wing is in this position the angle between the channel 8 and the horizontal is very small and will become zero when the critical angle of the wing is reached.

Referring to Figure 5, there is shown a modified form of the arrangement of the airfoil of Figure 3, wherein a tail flap is used. The channel 8 and closure members 9 and 10 are the same as shown in Figure 3, however, an additional flap 15 is provided near the trailing edge of the wing. Flap 15 is pivotally mounted upon a suitable bearing member 16 and is adapted to be actuated by means of a linkage designated generally by numeral 17. Linkage 17 is connected to an arm 18 mounted upon shaft 12 and adapted to be actuated by means of the aircraft control stick. In this arrangement when shaft 12 is rotated, closure member 9 moves upwardly towards recess 14 and flap 15 is moved downwardly away from the under surface of the wing. The purpose of this arrangement is to facilitate control of the aircraft both on taking off and landing, since flap 15 has considerable braking action and cooperates with the passage or channel to provide increased lift.

Referring to Figure 6, which is a modified form of the arrangement in Figure 5, a plurality of closure elements 19 are used in place of the single element 10. Closure members 19 are suitably mounted so that they may freely move about their pivotal points and provide an opening of variable area. When the elements are in a closed position, they form a substantially continuous surface so that the upper portion of the airfoil is unbroken and they are so mounted that any one of the elements is free to move independently of the other. It is to be noted that the total area of the openings formed between the elements 19 is equal to the area of the outlet opening of the passage. In other words, there is a predetermined relation between the area of the inlet and outlet openings and this ratio is maintained, regardless of the form of closure elements used.

Referring to Figures 7 and 8, there are shown further modifications of the airfoil wherein a plurality of passages or channels are used. In Figure 7 channels 20 and 21 are arranged so that they form a single passage 22 near the exit end and the top surface of the airfoil thus providing two inlet openings 22 and 23 on the under surface of the wing. The inclinations of passages 20 and 21 are at different angles with respect to a chord of the airfoil, channel 21 being at an angle substantially equal to the critical angle of the airfoil while channel 21 is inclined at a steeper angle.

The purpose of the above described arrangement is to maintain a continuous and uniform flow of air over and away from the top surface of the airfoil at very high angles of attack. As the angle of attack increases, the flow of air which would be normally cut off from passage 20 is picked up and permitted to flow through passage 21 when the angle between passage 20 and the horizontal becomes zero. In Figure 8, the airfoil is provided with channels 24 and 25, which extend through the airfoil and terminate in separate outlet openings 26 and 27 in the upper surface of the wing. As with the arrangement shown in Figure 7, the angles of inclination of passages 24 and 25 are arranged so that an additional path for the air flow is provided after the angle between one of the passages and the horizontal becomes zero.

Referring to Figure 9, there is shown a graph of the lift curves showing a comparison between a standard airfoil and an airfoil constructed according to the present invention. Curve 28, which has been plotted from values obtained in actual tests on a standard airfoil, shows that the lift increases fairly uniformly up to an angle of attack of approximately sixteen degrees and then the lift falls off rather abruptly. Curve 29 is plotted from data obtained by tests made with the same airfoil, provided with a passage or channel as shown in Figure 3. It will be noted that the provision of the passage in the standard airfoil increases the lift materially and that instead of falling off at an angle of sixteen degrees, that the lift increases substantially uniformly beyond this angle up to and including an angle of attack of twenty-two degrees. Curve 30 shows the lift of a standard airfoil equipped with the channel and the flap mounted near the tail thereof. This arrangement provides an initially higher lift and as indicated in the curve, the lift increases substantially uniformly.

As hereinbefore indicated, the arrangement of the passages, areas of inlet and outlet openings and their configuration, are all connected to provide a uniform air flow along the top surface of the airfoil as the angle of attack increases. For this reason, the surfaces near the points of air intake and outlet are curved as at 31 and 32, so that the path of the freely flowing air may be shaped to conform with the contour of the airfoil when the air is discharged from the channel. It will be understood that the passage may or may not be provided with closure members. I have found that the lift is materially increased by using an open end channel without closure flaps.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

What is claimed is:

1. An airfoil having a passage extending therethrough, said passage making a positive angle with respect to the chord of the airfoil substantially equal to the critical angle of the airfoil.

2. An airfoil having a plurality of passages extending therethrough, one of said passages making a positive angle with respect to the chord of the airfoil substantially equal to the critical angle of the airfoil, another of said passages being inclined at a positive angle greater than the critical angle of the airfoil.

3. An airfoil having a tapered passage extending therethrough, said passage making a positive angle with respect to the chord of the airfoil substantially equal to the critical angle of the airfoil.

4. An airfoil having a plurality of tapered passages extending therethrough, one of said passages making a positive angle with respect to the chord of the airfoil substantially equal to the critical angle of the airfoil, another of said passages being inclined at a positive angle greater than the critical angle of the airfoil.

5. An airfoil having a longitudinal passage extending therethrough, said passage making a positive angle with respect to the chord of the airfoil substantially equal to the critical angle of the airfoil.

6. An airfoil having a plurality of longitudinal passages extending therethrough, one of said passages making a positive angle with respect to the chord of the airfoil substantially equal to the critical angle of the airfoil, another of said passages being inclined at a positive angle greater than the critical angle of the airfoil.

7. An airfoil having a longitudinal tapered air passage extending therethrough, said passage making a positive angle with respect to the chord of the airfoil substantially equal to the critical angle of the airfoil.

8. An airfoil having a plurality of longitudinal tapered air passages extending therethrough, one of said passages making a positive angle with respect to the chord of the airfoil substantially equal to the critical angle of the airfoil, another of said passages being inclined at a positive angle greater than the critical angle of the airfoil.

9. An airfoil having a longitudinal air passage and a plurality of transverse air passages extending therethrough, said longitudinal passages making a positive angle with respect to a chord of the airfoil substantially equal to the critical angle of the airfoil.

10. An airfoil having a longitudinal tapered air passage and a plurality of transverse tapered air passages extending therethrough, said longitudinal passage making a positive angle with respect to the chord of the airfoil substantially equal to the critical angle of the airfoil.

11. An aircraft wing structure comprising a body portion having an air passage extending therethrough, said passage making a positive angle with the chord of the wing substantially equal to the critical angle of the wing and closure means for said passage comprising flap members pivotally mounted adjacent the inlet and outlet openings of the passage.

12. An aircraft wing structure comprising a body portion having a longitudinal tapered air passage extending therethrough, said air passage making a positive angle with the chord of the wing substantially equal to the critical angle of the wing and closure means for said passage comprising flap members pivotally mounted adjacent the inlet and outlet openings of the passage.

13. An aircraft wing structure comprising a body portion having an air passage extending therethrough, said passage making a positive angle with a chord of the wing substantially equal to the critical angle of the wing and closure means for said passage comprising flap members pivotally mounted adjacent the inlet and outlet openings of the passage, the closure member for the outlet being free to move independently of the closure member for the inlet opening.

14. An aircraft wing structure comprising a body portion having a longitudinal tapered air passage extending therethrough, said passage making a positive angle with a chord of the wing substantially equal to the critical angle of the wing and closure means for said passage comprising flap members pivotally mounted adjacent the inlet and outlet openings of the passage, the closure member for the outlet being free to move independently of the closure member for the inlet opening.

15. An aircraft wing structure comprising a body portion having an air passage extending therethrough, said passage making a positive angle with respect to a chord of the wing substantially equal to the critical angle of the wing, closure means for said passage comprising flap members pivotally mounted adjacent the inlet and outlet openings of the passage and a pivotally mounted flap positioned on the under side of the wing between the inlet to the air passage and the trailing edge of the wing.

16. An aircraft wing structure comprising a body portion having a longitudinal tapered air passage extending therethrough, said passage making a positive angle with respect to a chord of the wing substantially equal to the critical angle of the wing, closure means for said passage comprising flap members pivotally mounted adjacent the inlet and outlet openings of the passage, the closure member associated with the outlet opening being freely movable independently of the closure member for the inlet opening and a pivotally mounted flap positioned upon the under surface of the wing between the inlet to the air passage and the trailing edge of the wing.

WILBUR E. METHVIN.